(12) United States Patent
Ali et al.

(10) Patent No.: US 9,332,567 B1
(45) Date of Patent: May 3, 2016

(54) SYSTEM FOR RECOVERING UNRESPONSIVE COMMON PUBLIC RADIO INTERFACE (CPRI) NODES

(71) Applicant: FREESCALE SEMICONDUCTOR, INC., Austin, TX (US)

(72) Inventors: Inayat Ali, Jabalpur (IN); Somvir Dahiya, Ghaziabad (IN); Arvind Kaushik, Ghaziabad (IN); Sachin Prakash, Noida (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/724,738

(22) Filed: May 28, 2015

(51) Int. Cl.
*H04B 7/00* (2006.01)
*H04W 72/12* (2009.01)
*H04W 24/04* (2009.01)

(52) U.S. Cl.
CPC .......... *H04W 72/1252* (2013.01); *H04W 24/04* (2013.01)

(58) Field of Classification Search
USPC ............................. 455/509, 424, 561; 714/2
See application file for complete search history.

(56) References Cited

U.S. PATENT DOCUMENTS

| 6,788,707 | B1 | 9/2004 | Horton, Jr. et al. |
| 8,130,729 | B2 | 3/2012 | Hara |
| 9,031,056 | B2 | 5/2015 | Jain |
| 2009/0100307 | A1* | 4/2009 | Lee ........................ G06F 9/4403 714/746 |
| 2010/0130147 | A1 | 5/2010 | Kanda |
| 2014/0043957 | A1* | 2/2014 | Venkatraman ...... H04L 41/0672 370/216 |

* cited by examiner

*Primary Examiner* — Fayyaz Alam
(74) *Attorney, Agent, or Firm* — Charles E. Bergere (57) ABSTRACT

An integrated circuit (IC) in an unresponsive radio equipment (RE) node includes a common public radio interface (CPRI) controller, a processor, and a system reset controller that includes an L1 (Layer 1) reset controller. The CPRI controller generates a reset request signal based on a CPRI reset request received from an RE controller (REC). The L1 reset controller generates a traffic stop signal based on the reset request signal. The CPRI controller generates a traffic idle signal based on the traffic stop signal. The L1 reset controller receives the traffic idle signal before a predetermined time period and generates a system reset signal for resetting the processor, thereby recovering the unresponsive RE node without disrupting the network topology of a communication system that includes the REC and multiple RE nodes including the unresponsive RE node connected via a CPRI link.

20 Claims, 6 Drawing Sheets

SYSTEM FOR RECOVERING UNRESPONSIVE COMMON PUBLIC RADIO INTERFACE (CPRI) NODES

BACKGROUND

The present invention generally relates to communication systems, and, more particularly, to common public radio interface (CPRI) nodes in a communication system.

A communication system includes transmitter and receiver systems that exchange information with other communications systems in a communication network via optical fibers, electrical links, or wireless modes of communication. The communication systems that use a wireless mode of communication use radio-frequency (RF) signals, and hence, such communication systems are referred to as radio communication systems.

A radio communication system includes at least one radio equipment controller (REC) and one or multiple radio equipment (RE) nodes that exchange control signals through a common public radio interface (CPRI) link. The CPRI link includes at least one of an electrical and optical interface. The control signals thus exchanged follow a CPRI protocol such as an L1 in-band protocol. The CPRI protocol enables transmission of real-time baseband and input data as well as control information. Thus, the communication system is a real-time communication system. The control signals include link status signals such as loss of signal (LOS), loss of frame (LOF), and other layer 1 (L1) alarms such as remote alarm indication (RAI) and serial data interface (SDI).

Further, the RECs and the RE nodes are connected as communication nodes in a network topology. The network topology can be any one of star, tree, mesh, daisy-chain, bus, and ring topologies. Multiple RE nodes may be connected to one REC, multiple RECs may be connected to one RE node, and multiple RECs may be connected to multiple RE nodes based on the topology. The REC includes a baseband processor that decodes and encodes data traffic that is received and sent, respectively, by way of an antenna. The RE node includes a digital signal conditioning circuit for receiving the control signal from the REC by way of the CPRI link. The digital signal conditioning circuit modulates the strength of the control signal.

For example, the network topology may be a daisy-chain network topology and the communication system includes first through third radio equipment nodes. The REC is a master controller and the RE nodes are connected through the CPRI link such that a CPRI port of the REC is connected to a CPRI slave port of the first RE node. A CPRI master port of the first RE node is connected to a CPRI slave port of the second RE node. Similarly, a CPRI master port of the second RE node is connected to a CPRI slave port of the third RE node. Thus, the CPRI master port and the CPRI slave port of each RE node are connected to the CPRI slave port and the CPRI master port of adjacent REC or RE nodes, respectively. Further, each RE node includes a CPRI sub-system for configuring and maintaining the CPRI link and a processor.

When the REC sends a control signal through the CPRI link, the RE nodes connected in the daisy-chain network topology receive the control signal through the corresponding CPRI slave ports. A RE node may become unresponsive, i.e., does not respond to the control signal sent by the REC when at least one or a combination of the following scenarios occur—the processor of the RE node is in a hung state, electronic circuits on a system-on-chip (SoC) connected to the processor of the RE node malfunction, or when the CPRI sub-system behaves abnormally. Thus, the CPRI link may breakdown, thereby disrupting the daisy-chain network topology.

A known technique to eliminate the above-mentioned problem includes utilization of downlink (DL) and uplink (UL) function units and a reset function unit in each RE node. In one embodiment, the RE nodes and the REC are connected in a daisy-chain network topology and exchange control words by way of the CPRI link. When the processor of the second RE node is functioning abnormally, a DL function unit of the second RE node sets a software alarm notification field corresponding to the second RE node in the control words to 1 for indicating abnormality in the working of the second RE node. When the REC receives the control words, the REC identifies abnormality in the working of the second RE node based on the software alarm notification field corresponding to the second RE node. The REC sets a software reset field, in the control words, corresponding to the second RE node to 1 for resetting the second RE node. The REC transmits the control words and each RE node receives and decodes the control words to determine whether corresponding software reset field is set to 1 by the REC.

When the DL function unit of the second RE node identifies that the software reset field corresponding to the second RE node is set to 1, the DL function unit of the second RE node generates an output signal for the reset function unit of the second RE node. The reset function unit of the second RE node generates a reset signal to reset the second RE node based on the output signal. Subsequent to resetting of the second RE node, the UL function unit of the second RE node resets the software reset field corresponding to the second RE node to 0. The control words are transmitted to the REC, thereby indicating that the second RE node has been reset. Although the above technique resets a RE node, the technique does not provide a method for recovering the RE node without disrupting the network topology.

In another example, due to any malfunctioning of the processor and the SoC, the REC resets a RE node even though the CPRI sub-system that services the CPRI link is functional. Further, since the unresponsive RE node is the intermediate RE node, all RE nodes beyond the intermediate RE node require auto-negotiating operation for re-establishing the CPRI link. This causes large power and time overheads and creates chaos in the real-time communication system.

Therefore, it would be advantageous to have a system and method for recovering unresponsive common public radio interface (CPRI) nodes in a communication system, prevents disruption of network topology of the communication system, reduces time and power over head, and provides a recovery scheme for the unresponsive CPRI nodes in a phased manner.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, an integrated circuit (IC) for recovering a RE node of a plurality of RE nodes in a communication system is provided. The communication system further includes a REC connected to the plurality of RE nodes by way of a common public radio interface (CPRI) link in a predetermined network topology. The integrated circuit includes a CPRI controller, a processor, and a system reset controller. The CPRI controller receives a plurality of control signals by way of a CPRI slave port, a CPRI reset request by way of the CPRI slave port, generates a reset request signal based on the CPRI reset request, receives a traffic stop signal, and generates a traffic idle signal based on the traffic stop signal. The processor receives the plurality of control signals and processes the plurality of control signals. The system reset controller includes a counter and an L1 reset controller. The system reset controller receives the reset request signal. The counter receives a timer start signal and generates a timer end signal after a predetermined time period based on the timer start signal. The L1 reset controller receives the reset request signal and generates the traffic stop signal and the timer start signal, receives at least one of the traffic idle signal and the timer end signal, respectively, and generates a system reset signal when the traffic idle signal is received during the predetermined time period, wherein the L1 reset controller resets the processor by way of the system reset signal and thereby recovers the RE node.

In another embodiment of the present invention, a method for recovering a RE node of a plurality of RE nodes in a communication system is provided. The communication system includes a REC connected to the plurality of RE nodes by way of a common public radio interface (CPRI) link in a predetermined network topology. A CPRI controller receives a CPRI reset request by way of a CPRI slave port and generates a reset request signal based on the CPRI reset request. An L1 reset controller receives the reset request signal and generates a traffic stop signal and a timer start signal based on the reset request signal. The CPRI controller receives the traffic stop signal and generates a traffic idle signal based on the traffic stop signal. A counter receives the timer start signal and generates a timer end signal after a predetermined time period based on the timer start signal. The L1 reset controller receives at least one of the traffic idle signal and the timer end signal and generates a system reset signal when the traffic idle signal is received during the predetermined time period, wherein the L1 reset controller resets a processor of the RE node by way of the system reset signal and hence, recovers the RE node.

Various embodiments of the present invention provide an integrated circuit (IC) for recovering a RE node of a plurality of RE nodes in a communication system. The communication system includes a REC connected to the plurality of RE nodes by way of a common public radio interface (CPRI) link in a predetermined network topology. The IC includes a CPRI controller, a processor, and a system reset controller. The CPRI controller receives a plurality of control signals by way of a CPRI slave port, a CPRI reset request by way of the CPRI slave port, generates a reset request signal based on the CPRI reset request, receives a traffic stop signal, and generates a traffic idle signal based on the traffic stop signal. The processor receives the plurality of control signals and processes the plurality of control signals. The system reset controller receives the reset request signal. The system reset controller includes a counter and an L1 reset controller. The counter receives a timer start signal and generates a timer end signal after a predetermined time period based on the timer start signal. The L1 reset controller receives the reset request signal and generates the traffic stop signal and the timer start signal, receives at least one of the traffic idle signal and the timer end signal, and generates a system reset signal when the traffic idle signal is received during the predetermined time period. The L1 reset controller resets the processor by way of the system reset signal, thereby recovering the RE node. Thus, the RE node is recovered without affecting the predetermined network topology. Moreover, the power overhead is less as only the affected RE node is recovered among the multiple RE nodes connected in the predetermined network topology.

Figure 1:
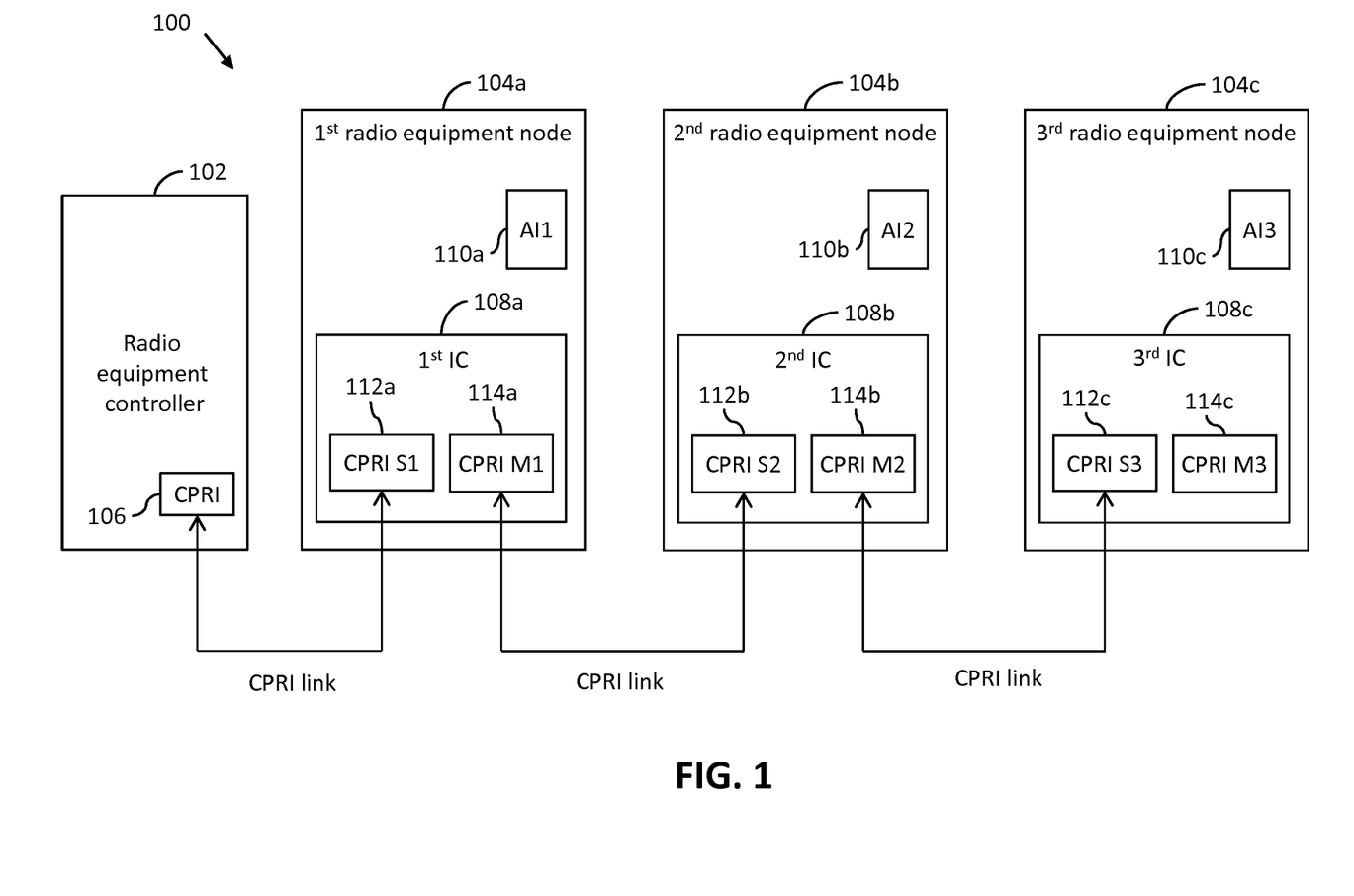
FIG. 1 is a schematic block diagram of a communication system that includes a REC and a plurality of RE nodes in accordance with an embodiment of the present invention.

Referring now to FIG. 1, a schematic block diagram of a communication system 100 in accordance with an embodiment of the present invention is shown. In one embodiment, the communication system 100 includes a REC 102 and first through third RE nodes 104a-104c (collectively referred to as RE nodes 104). The REC 102 and the RE nodes 104 exchange control information or control signals through a common public radio interface (CPRI) link. The CPRI link is based on a CPRI protocol that allows transmission of real-time baseband and input data as well as control information. Thus, the communication system 100 is a real-time communication system and the RE nodes 104 are also referred to as common public radio interface (CPRI) nodes.

The REC 102 includes a CPRI port 106. The first through third RE nodes 104a-104c include first through third integrated circuits (ICs) 108a-108c (collectively referred to as ICs 108), respectively, and first through third antenna interfaces 110a-110c (collectively referred to as antenna interfaces 110). The first through third ICs 108 include first through third CPRI slave ports 112a-112c (collectively referred to as CPRI slave ports 112), respectively. The first through third ICs 108 further include first through third CPRI master ports 114a-114c (collectively referred to as CPRI master ports 114).

The REC 102 further includes a processor (not shown). In one embodiment, the processor is a baseband processor. The processor encodes and decodes the user data frames that are received or to be transmitted by antennas corresponding to the RE nodes 104. The REC 102 also transmits control information to the RE nodes 104, thus controlling the operation of the RE nodes 104. The control information is transmitted from the REC 102 by way of the CPRI port 106 in the form of the control signals.

The RE nodes 104 communicate with the REC 102 by way of the CPRI link. The RE nodes 104 and the REC 102 are connected in a predetermined network topology by electrical or optical links (CPRI links). The predetermined network topology can be any one of star, tree, mesh, daisy-chain, bus, and ring network topologies. The CPRI link is utilized for transmitting user plane data, control and management plane data, and synchronization plane data. The CPRI link further utilizes an L1 in-band protocol for transmitting timing critical information and link maintenance information such as link status information and layer 1 alarm signals. Link status information includes loss of signal (LOS) and loss of frames (LOFs). Layer 1 alarm signals include remote alarm indication (RAI), serial data interface (SDI), and system start-up information.

The RE nodes 104 include first through third processors (not shown), respectively. In one embodiment, the first through third processors are digital frond-end processors.

The antenna interfaces 110 further include transmitting and receiving antennas. In one embodiment, the user plane data that is transmitted over the CPRI link is in the form of an in-phase and quadrature phase (I/Q) data. Such I/Q data is transmitted by way of the transmitting and receiving antennas.

Figure 2:
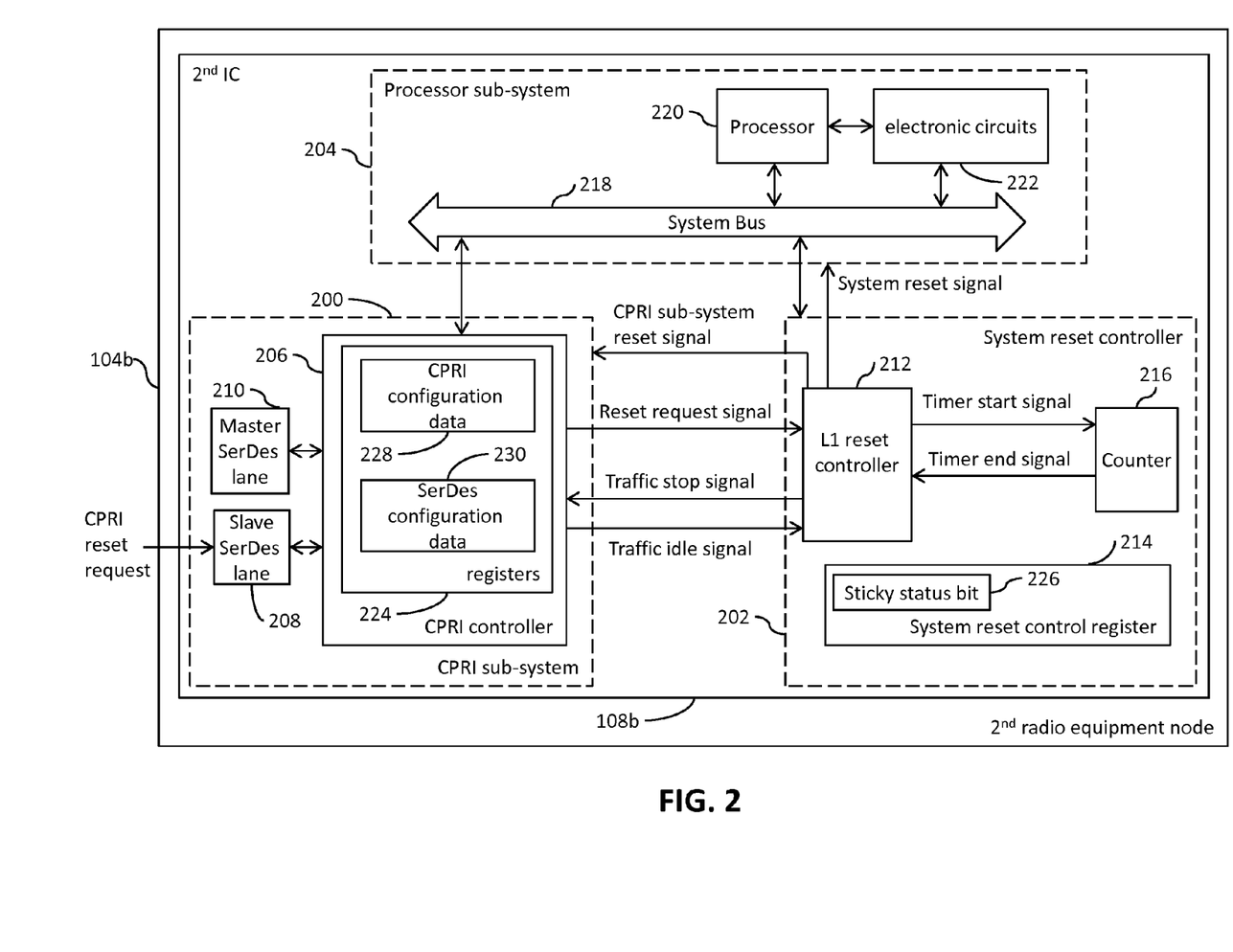
FIG. 2 is a schematic block diagram of an integrated circuit (IC) of a RE node of the plurality of RE nodes of FIG. 1 in accordance with an embodiment of the present invention.

Referring now to FIG. 2, a schematic block diagram of the second RE node 104b in accordance with an embodiment of the present invention is shown. The first and third RE nodes 104a and 104c are structurally and functionally similar to the second RE node 104b. The second IC 108b includes a CPRI sub-system 200, a system reset controller 202, and a processor sub-system 204.

The CPRI sub-system 200 maintains the CPRI link of the second RE node 104b. The CPRI sub-system 200 includes a CPRI controller 206, a first Serializer-Deserializer (SerDes) lane 208 (hereinafter referred to as a "slave SerDes lane"), and a second SerDes lane 210 (hereinafter referred to as a "master SerDes lane"). The system reset controller 202 includes an L1 reset controller 212, a system reset control register 214, and a counter 216. The processor sub-system 204 includes a system bus 218, a processor 220, and electronic circuits 222 (hereinafter referred to as "electronic circuits 222"). The CPRI controller 206 includes multiple registers 224 (hereinafter referred to as "registers 224"). The system reset control register 214 stores a sticky status bit 226. The registers 224 store a CPRI configuration data 228 and a SerDes configuration data 230.

Figure 3:
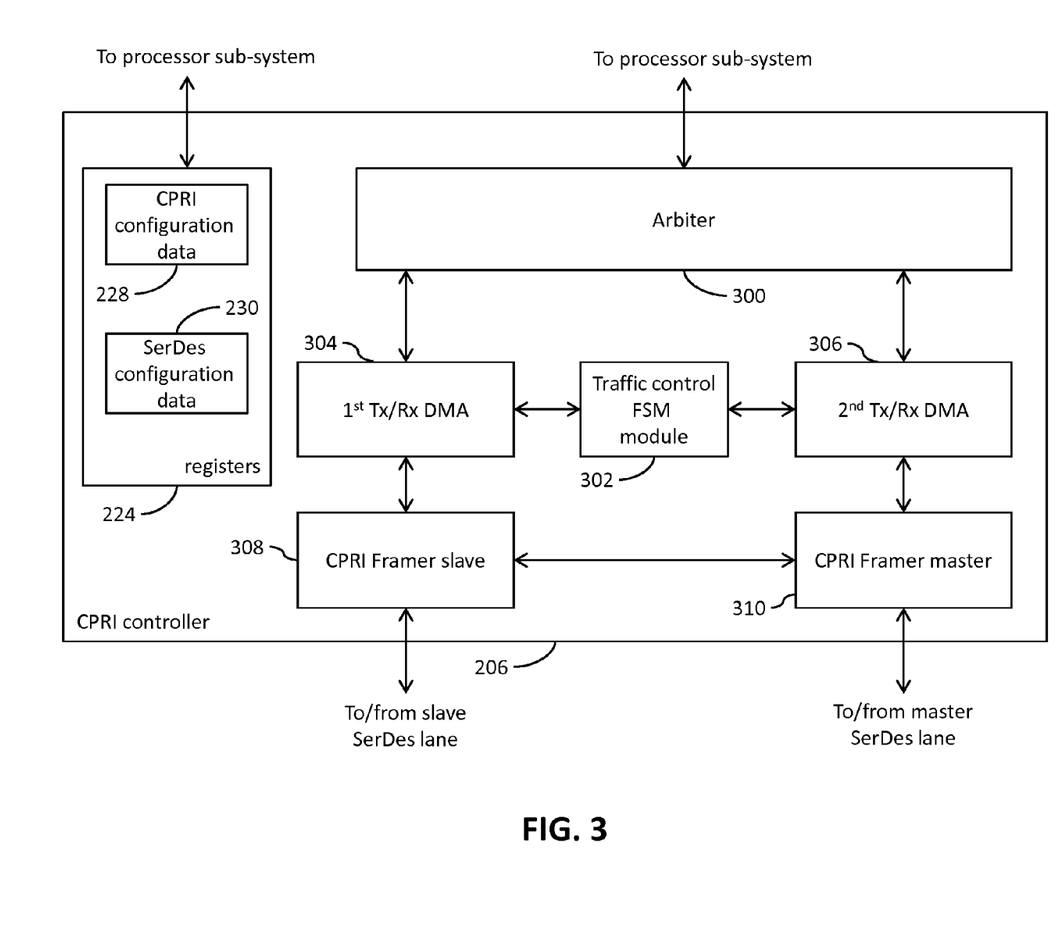
FIG. 3 is a schematic block diagram of a CPRI controller of the integrated circuit of FIG. 2 in accordance with an embodiment of the present invention.

Referring now to FIG. 3, a schematic block diagram of the CPRI controller 206 in accordance with an embodiment of the present invention is shown. FIG. 3 is explained in conjunction with FIG. 2. The CPRI controller 206 includes an arbiter 300, a traffic control finite state machine (FSM) module 302, first and second transmitter and receiver direct memory access (DMA) systems 304 and 306, a CPRI framer slave 308, and a CPRI framer master 310. The CPRI framer slave 308 and the CPRI framer master 310 are connected to the slave and master SerDes lanes 208 and 210, respectively. Further, the slave and master SerDes lanes 208 and 210 correspond to the second CPRI slave port 112b and the second master port 114b, respectively.

The CPRI controller 206 receives the control signals by way of the second CPRI slave port 112b. The slave and master SerDes lanes 208 and 210 are high speed lanes that are used for transmitting and receiving the control signals that include CPRI frames between the RE nodes 104 and the REC 102. The control signals conform to at least one of a control plane data type, a layer 1 (L1) in-band signal data type, and a vendor specific data type. Each CPRI frame includes first through sixteen words. The first through sixteen words are identified utilizing indices 0 to 15. The first word at the index 0 of the CPRI frame includes control words. The second through sixteen words at the indices 1 to 15, respectively, of the CPRI frame include the I/Q data. The CPRI framer slave and master 308 and 310 are used for receiving and transmitting the CPRI frames over the slave and master SerDes lanes 208 and 210, respectively. The CPRI framer slave 308 and the CPRI framer master 310 form a CPRI framer module (not shown).

The CPRI framer module defines CPRI frame structures and manages transmission of the generated frames on the slave SerDes lane 208 of the second RE node 104b. The CPRI framer module further extracts information from the CPRI frames that are received on the master SerDes lane 210 from other RE nodes or the REC 102 by way of the CPRI link and generates control data. The CPRI framer module provides the extracted information or the control data from the CPRI frames to the first and second transmitter and receiver DMA systems 304 and 306. The first and second transmitter and receiver DMA systems 304 and 306 receive the control data from the CPRI framer module and transmit the control data to a memory (not shown) of the second RE node 104b. Subsequently, such control data is provided to the processor sub-system 204 for utilization by the processor 220. The first and second transmitter and receiver DMA systems 304 and 306 further retrieve the control data from the memory (not shown) and provide the control data to the CPRI framer module. In one embodiment, such control data is generated by the processor 220 and is required to be transmitted to the REC 102. Based on the control data, the CPRI framer module generates the CPRI frames for transmission over the CPRI link.

The traffic control FSM module 302 executes a traffic control FSM. The traffic control FSM module 302 further includes flip-flops and logic gates. The traffic control FSM module 302 is connected to the first and second transmitter and receiver DMA systems 304 and 306. The traffic control FSM module 302 is operable in 'idle' and 'disable' states. The traffic control FSM module 302 generates and provides an output signal to the first and second transmitter and receiver DMA systems 304 and 306 based on the operation state thereof. In one embodiment, when the traffic control FSM module 302 is in the 'idle' state, the first and second transmitter and receiver DMA systems 304 and 306 are operational to receive control data from the CPRI framer module and transmit the control data to the memory. The traffic control FSM module 302 transitions from the 'idle' state to the 'disable' state when the traffic control FSM module 302 receives a traffic stop signal. The traffic control FSM module 302 disables the first and second transmitter and receiver DMA systems 304 and 306 when the traffic control FSM module 302 is in the 'disable' state. The traffic control FSM module 302 waits for the first and second transmitter and receiver DMA systems 304 and 306 to complete all data transactions and then generates a traffic idle signal as the output signal and transitions to the 'idle' state. The arbiter 300 arbitrates between the transactions occurring between the first and second transmitter and receiver DMA systems 304 and 306.

The CPRI configuration data 228 includes data for maintaining and functioning of the CPRI link. The SerDes configuration data 230 includes data for maintaining and functioning of the slave and master SerDes lanes 208 and 210. In an embodiment of the present invention, the CPRI configuration data 228 and the SerDes configuration data 230 are stored when the second RE node 104b is initially configuring the CPRI link.

The system reset controller 202 generates signals to reset components of the second IC 108b. The L1 reset controller 212 executes a finite state machine (FSM, not shown) for generating output signals based on the received input signals. In one embodiment, the L1 reset controller 212 executes the FSM. The FSM of the L1 reset controller 212 is operable in 'idle', 'wait', and 'reset' states. The FSM of the L1 reset controller 212 transitions from the 'idle' state to the 'wait' state on receiving a reset request signal from the CPRI controller 206 and generates the traffic stop signal. The FSM of the L1 reset controller 212 transitions from the 'wait' state to the 'reset' state on receiving at least one of the traffic idle signal and a timer end signal and generates corresponding reset signals for the processor sub-system 204 and the CPRI sub-system 200. Further, in the 'reset' state, the system reset control register 214 stores the sticky status bit 226 that can be set to logic high and low states. The logic state of the sticky status bit 226 indicates that a CPRI sub-system reset signal is generated for resetting the CPRI sub-system 200. In one embodiment, when the sticky status bit 226 is at logic low state, the sticky status bit 226 indicates that the CPRI sub-system 200 is reset along with the processor sub-system 204. When the sticky status bit 226 is at logic high state, the sticky status bit 226 indicates that the CPRI sub-system 200 is not reset along with the processor sub-system 204.

The counter 216 is connected to the L1 reset controller 212 for receiving a timer start signal. On receiving the timer start signal, the counter 216 starts counting up to a programmed timer value. The programmed timer value is indicative of a predetermined time period. In an embodiment, the programmed timer value is set to a predetermined value by the processor 220 during initial configuration phase. After the end of the programmed timer value, the counter 216 generates the timer end signal.

The system bus 218 includes an address bus, a data bus, and a control bus (collectively not shown). The system bus 218 is used for exchanging address, data, and control information between components on the second IC 108b.

The processor 220 receives data frames and processes the data frames. The data frames are received from the second antenna interface 110b. The processor 220 further receives the control signals from the CPRI framer slave and master 308 and 310 by way of the first and second transmitter and receiver DMA systems 304 and 306 and processes the control signals. More specifically, the processor 220 receives the control data corresponding to the control signals from the memory by way of the first and second transmitter and receiver DMA systems 304 and 306. The processor 220 is connected to the CPRI controller 206 by way of the system bus 218 for receiving the control signals. In an embodiment of the present invention, the electronic circuits 222 include all the components on the second IC 108b except for the components of the second IC 108b shown in FIG. 2.

In one embodiment, the predetermined network topology is a daisy-chain network topology. In the daisy-chain network topology, the first CPRI master port 114a is connected to the second CPRI slave port 112b. The second CPRI master port 114b is connected to the third CPRI slave port 112c. The third CPRI master port 114c is connected to a fourth CPRI slave port (not shown) in a fourth RE node (not shown). The final RE node in the daisy-chain network topology includes only one port for receiving data from its preceding RE node through the CPRI link. The REC 102 includes the CPRI port 106 for transmitting control signals that include the CPRI frames on the CPRI link. The CPRI port 106 is connected to the first CPRI slave port 112a of the first RE node 104a by way of the CPRI link. In another embodiment of the present invention, the communication system 100 includes a plurality of RECs including the REC 102. The RECs and the RE nodes 104 may be connected in the predetermined network topology.

For example, the second RE node 104b may be unresponsive to the control signals generated by the REC 102, such as when one of the components in the processor sub-system 204 and the CPRI sub-system 200 functions abnormally. Thus, the second RE node 104b stops processing data traffic. The RE controller 102 identifies the unresponsive second RE node 104b and generates a CPRI reset request for the second RE node 104b. For example, the CPRI reset request may be received by the first RE node 104a at the first CPRI slave port 112a by way of a vendor specific channel, an Ethernet cable, or sideband signaling. The first RE node 104a generates a layer 1 (L1) in-band reset signal to the second RE node 104b. Thus, the CPRI reset request is indicative of the L1 in-band reset signal.

The second CPRI slave port 112b of the second RE node 104b is connected to the first CPRI master port 114a for receiving the CPRI reset request. The slave SerDes lane 208 receives the CPRI reset request from the second CPRI slave port 112b. The CPRI controller 206 thus receives the CPRI reset request from the slave SerDes lane 208 and generates the reset request signal. The system reset controller 202 is connected to the CPRI controller 206 for receiving the reset request signal. Thus, the L1 reset controller 212 receives the reset request signal and generates the traffic stop signal and the timer start signal. The L1 reset controller 212 provides the traffic stop signal to the CPRI controller 206 and the timer start signal to the counter 216.

When the CPRI sub-system 200 is functioning normally and one of the components on the second IC 108b other than the CPRI sub-system 200 is malfunctioning, the CPRI controller 206 receives the traffic stop signal from the L1 reset controller 212. The traffic control FSM module 302 further receives the traffic stop signal. On receiving the traffic stop signal, the traffic control FSM module 302 comes out of the 'idle' state and transitions to the 'disable' state, thereby disabling the first and second transmitter and receiver DMA systems 304 and 306. Disabling the first and second transmitter and receiver DMA systems 304 and 306 ensures that the first and second transmitter and receiver DMA systems 304 and 306 do not generate additional data traffic towards the system bus 218. Moreover, the first and second transmitter and receiver DMA systems 304 and 306 complete the existing data transfer operation. When the first and second transmitter and receiver DMA systems 304 and 306 have completed the existing data transfer operation, the traffic control FSM module 302 generates the traffic idle signal and transitions back to the 'idle' state.

The FSM of the L1 reset controller 212 is in the 'idle' state before receiving the reset request signal. After receiving the reset request signal, the FSM of the L1 reset controller 212 generates the traffic stop signal and the timer start signal and transitions to the 'wait' state. In the 'wait' state, the FSM of the L1 reset controller 212 waits to receive at least one of the traffic idle signal and the timer end signal. On receiving the traffic idle signal during the predetermined time period, i.e., when the traffic idle signal is received before the timer end signal, the L1 reset controller 212 transitions to the 'reset' state and generates a system reset signal.

The processor sub-system 204 is connected to the L1 reset controller 212 for receiving the system reset signal. Thus, the system bus 218, the processor 220, and the electronic circuits 222 receive the system reset signal. Since the components in the processor sub-system 204 receive the system reset signal, the processor sub-system 204 is reset on receiving the system reset signal. Further, the system reset controller 202 is reset when the L1 reset controller 212 generates the system reset signal thereby resetting the L1 reset controller 212. Since the L1 reset controller 212 and the counter 216 form the system reset controller 202, the counter 216 is also reset when the L1 reset controller 212 generates the system reset signal. Thus, when the traffic idle signal is received in the predetermined time period, the counter 216 is reset and stops counting and hence, does not generate the timer end signal.

Thus, the L1 reset controller 212 resets the processor 220 without resetting the CPRI sub-system 200 when the traffic idle signal is received during the predetermined time period, thereby recovering the second RE node 104b without disrupting the daisy-chain network topology.

When the L1 reset controller 212 generates the system reset signal during the predetermined time period, the sticky status bit 226 is set to logic high state. When the processor 220 is functional after reset, the processor 220 checks the logic state of the sticky status bit 226. Since the sticky status bit 226 is set to logic high state, the processor 220 fetches the CPRI configuration data 228 and the SerDes configuration data 230. Using the CPRI configuration data 228 and the SerDes configuration data 230, the processor 220 restores the data traffic when the sticky status bit 226 is at the logic high state after coming out of reset, thereby preventing disruption in the daisy-chain network topology. The processor 220 sets the sticky status bit 226 to logic low state after fetching the CPRI configuration data 228 and the SerDes configuration data 230. Moreover, antenna carrier traffic (referred to as "data traffic") that includes the I/Q data to be transmitted by the second antenna interface 110b is also restored.

Since, the CPRI sub-system 200 is not reset, the CPRI link remains intact and the second RE node 104b is recovered without disrupting the daisy-chain network topology. This reduces time and power overheads as power is consumed only during resetting of the system reset controller 202 and the processor sub-system 204. In another embodiment of the present invention, when a processor (not shown) or circuitry (not shown) of the RE controller 102 malfunction, a reset signal for resetting the RE controller 102 is generated by another RE controller (not shown) in the daisy-chain network topology.

When the CPRI sub-system 200 is malfunctioning, the CPRI controller 206 is not able to detect the traffic stop signal. Thus, the CPRI controller 206 does not generate the traffic idle signal during the predetermined time period.

Since, the L1 reset controller 212 does not receive the traffic idle signal during the predetermined time period, the counter 216 generates the timer end signal and provides the timer end signal to the L1 reset controller 212. The L1 reset controller 212 receives the timer end signal after the predetermined time period and generates the system reset signal and the CPRI sub-system reset signal.

The processor sub-system 204 receives the system reset signal. Thus, the system bus 218, the processor 220, the L1 reset controller 212, and the electronic circuits 222 are reset. The L1 reset controller 212 thus resets the processor sub-system 204 by way of the system reset signal. Further, the CPRI sub-system 200 receives the CPRI sub-system reset signal from the L1 reset controller 212. Thus, the L1 reset controller 212 resets the CPRI controller 206 and the CPRI sub-system 200 by way of the CPRI sub-system reset signal.

When the L1 reset controller 212 functions normally after resetting, the L1 reset controller 212 de-asserts the CPRI sub-system reset signal. When the CPRI sub-system reset signal is de-asserted, the CPRI sub-system 200 begins functioning normally. Since the CPRI sub-system 200 is reset, the CPRI link breaks. Subsequently, the second RE node 104b begins the CPRI link establishing process.

The third RE node 104c goes out of synchronization due to breaking of the CPRI link at the second RE node 104b and hence the second and third RE nodes 104b and 104c undergo an auto-negotiating process. The auto-negotiating process involves the second and third RE nodes 104b and 104c beginning to decode data signals at a specific rate and achieve synchronization with the first RE node 104a in the network topology at the same rate. When synchronization of the RE nodes 104 is achieved, the CPRI link is established and begins functioning normally. Thus, the RE controller 102 can now send the control signals to the RE nodes 104.

Figure 4A:
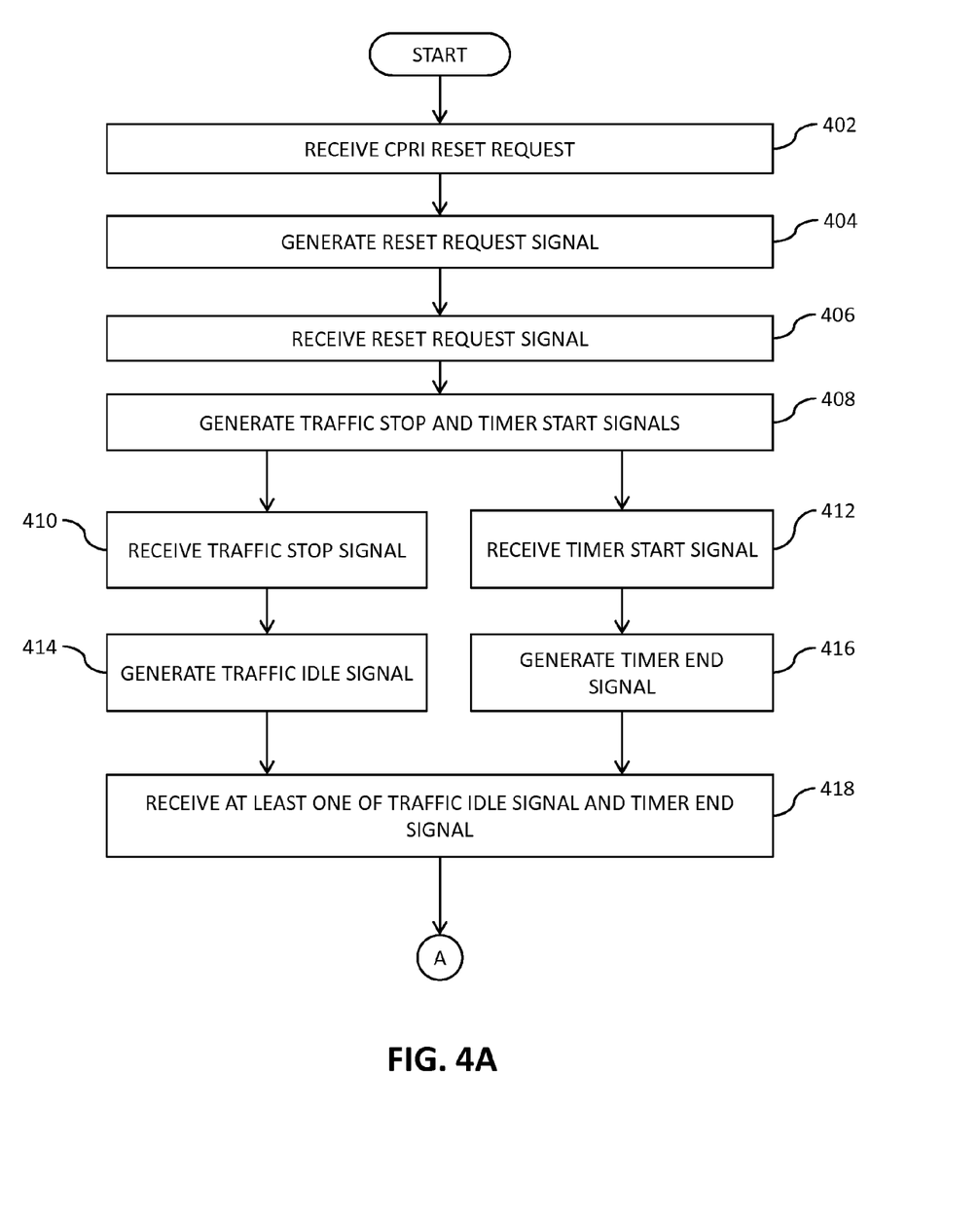
FIGS. 4A, 4B, and 4C are a flow chart illustrating a method for recovering RE nodes of a communication system in accordance with an embodiment of the present invention.
Figure 4B:
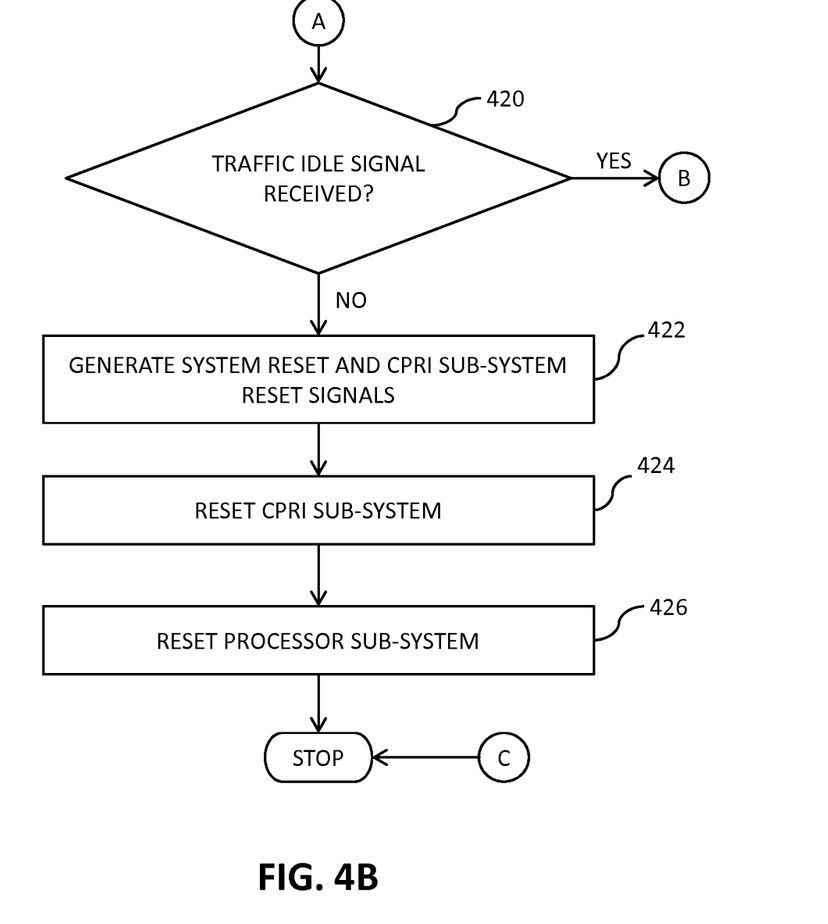
Figure 4C:
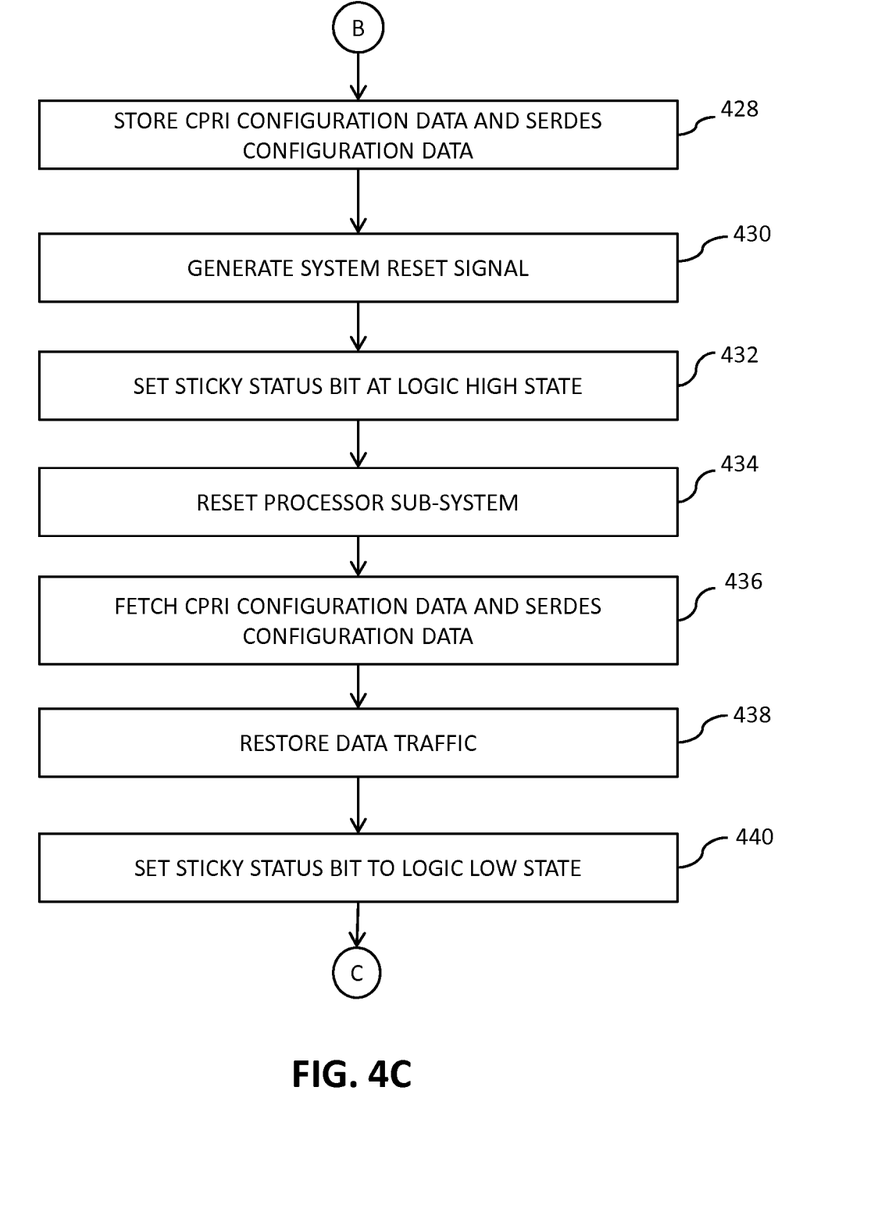

Referring now to FIGS. 4A, 4B, and 4C, a flow chart illustrating a method for recovering unresponsive RE nodes of the communication system 100 in accordance with an embodiment of the present invention is shown.

At step 402, the CPRI controller 206 in the second RE node 104b receives the CPRI reset request by way of the second CPRI slave port 112b. The CPRI reset request is generated by the REC 102 and is indicative of the layer 1 (L1) in-band reset signal.

At step 404, the CPRI controller 206 generates the reset request signal based on the CPRI reset request. At step 406, the L1 reset controller 212 receives the reset request signal. At step 408, the L1 reset controller 212 generates the traffic stop signal and the timer start signal based on the reset request signal. At step 410, the CPRI controller 206 receives the traffic stop signal. At step 412, the counter 216 receives the timer start signal. At step 414, the traffic control FSM module 302 generates a signal to disable the first and second transmitter and receiver DMA systems 304 and 306. Disabling the first and second transmitter and receiver DMA systems 304 and 306 ensures that the first and second transmitter and receiver DMA systems 304 and 306 do not generate additional data traffic towards the system bus 218. At step 416, the counter 216 generates the timer end signal after the predetermined time period based on the timer start signal. At step 418, the L1 reset controller 212 receives at least one of the traffic idle signal and the timer end signal. The L1 reset controller 212 receives the traffic idle signal within the predetermined time period when at least one of the processor 220 and the electronic circuits 222 are malfunctioning and the CPRI sub-system 200 is functioning normally. The L1 reset controller 212 receives the timer end signal after the predetermined time period when the CPRI sub-system 200 is malfunctioning.

At step 420, the L1 reset controller 212 checks to determine if the traffic idle signal is received during the predetermined time period. If at step 420, the L1 reset controller 212 determines that the traffic idle signal is not received during the predetermined time period, i.e., it is received after the predetermined time period, step 422 is executed. At step 422, the L1 reset controller 212 generates the system reset signal and the CPRI sub-system reset signal when the timer end signal is received after the predetermined time period. At step 424, the L1 reset controller 212 resets the CPRI sub-system 200 by providing the CPRI sub-system reset signal to the CPRI sub-system 200. At step 426, the L1 reset controller 212 resets the processor sub-system 204 by providing the system reset signal to the processor sub-system 204. When the system reset signal is generated by the L1 reset controller 212, the system reset controller 202 is reset, thereby resetting the L1 reset controller 212 and the counter 216. When the L1 reset controller 212 is reset, the L1 reset controller 212 de-asserts the CPRI sub-system reset signal, thereby indicating that the CPRI sub-system 200 is functional.

Thus, the second RE node 104b is recovered when the CPRI sub-system 200, the system reset controller 202, and the processor sub-system 204 come out of reset. The second and third RE nodes 104b and 104c undergo auto-negotiating process to re-establish the CPRI link.

However, if at step 420, the L1 reset controller 212 determines that the traffic idle signal is received during the predetermined time period, step 428 is executed.

At step 428, the CPRI configuration data 228 and the SerDes configuration data 230 are stored in the registers 224 during the initial configuration of the second RE node 104b on the CPRI link. At step 430, the L1 reset controller 212 generates the system reset signal on receiving the traffic idle signal during the predetermined time period. At step 432, the sticky status bit 226 is stored in the system reset control register 214 and is set at logic high state when the system reset signal is generated during the predetermined time period. At step 434, the processor sub-system 204 is reset by providing the system reset signal to the processor sub-system 204 without resetting the CPRI sub-system 200. At step 436, the processor 220 fetches the CPRI and SerDes configuration data 228 and 230 when the processor 220 is functional after reset. At step 438, the data traffic is restored by the processor 220 when the sticky status bit 226 is at logic high state, thereby preventing disruption in the daisy-chain network topology. At step 440, the processor 220 sets the sticky status bit 226 to logic low state after fetching the CPRI and SerDes configuration data 228 and 230.

It will be understood by those of skill in the art that the same logical function may be performed by different arrangements of logic gates, or that logic circuits operate using either positive or negative logic signals. Therefore, variations in the arrangement of some of the logic gates described above should not be considered to depart from the scope of the present invention. No element, act, or instruction used in the present application should be construed as critical or essential to the invention unless explicitly described as such. Further, the phrase "based on" is intended to mean "based, at least in part, on" unless explicitly stated otherwise.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. An integrated circuit (IC) for recovering a radio equipment (RE) node of a plurality of RE nodes in a communication system, wherein the communication system includes a radio equipment controller connected to the plurality of RE nodes by way of a common public radio interface (CPRI) link in a predetermined network topology, the integrated circuit comprising:
   a CPRI controller for receiving a plurality of control signals by way of a CPRI slave port, receiving a CPRI reset request by way of the CPRI slave port, generating a reset request signal based on the CPRI reset request, receiving a traffic stop signal, and generating a traffic idle signal based on the traffic stop signal;
   a processor connected to the CPRI controller for receiving the plurality of control signals and processing the plurality of control signals; and
   a system reset controller connected to the CPRI controller for receiving the reset request signal and to the processor, wherein the system reset controller includes:
      a counter for receiving a timer start signal and generating a timer end signal after a predetermined time period based on the timer start signal; and
      a Layer 1 (L1) reset controller for receiving the reset request signal and generating the traffic stop signal and the timer start signal therefrom, receiving at least one of the traffic idle signal and the timer end signal, and generating a system reset signal when the traffic idle signal is received during the predetermined time period, wherein the L1 reset controller resets the processor by way of the system reset signal, thereby recovering the radio equipment node.

2. The integrated circuit of claim 1, wherein the plurality of control signals conforms to at least one of a control plane data type, a L1 in-band signal data type, and a vendor specific data type.

3. The integrated circuit of claim 1, wherein the CPRI reset request is generated by the radio equipment controller and is indicative of a L1 in-band reset signal.

4. The integrated circuit of claim 1, further comprising:
   a first serializer-deserializer (SerDes) lane corresponding to a CPRI master port; and
   a second SerDes lane corresponding to the CPRI slave port, wherein the first and second SerDes lanes and the CPRI controller form a CPRI sub-system for receiving a CPRI sub-system reset signal.

5. The integrated circuit of claim 4, wherein the CPRI controller further includes a plurality of registers for storing CPRI configuration data and SerDes configuration data.

6. The integrated circuit of claim 5, further comprising:
   a plurality of electronic circuits; and
   a system bus, wherein the plurality of electronic circuits, the system bus, and the processor form a processor sub-system, and wherein the L1 reset controller further provides the system reset signal to the processor sub-system, thereby resetting the processor sub-system.

7. The integrated circuit of claim 6, wherein the system reset controller is reset when the L1 reset controller generates the system reset signal, thereby resetting the L1 reset controller and the counter.

8. The integrated circuit of claim 7, wherein the L1 reset controller resets the processor sub-system without resetting the CPRI sub-system when the traffic idle signal is received during the predetermined time period, thereby recovering the radio equipment node without disrupting the predetermined network topology.

9. The integrated circuit of claim 8, wherein:
   the system reset controller further includes a system reset control register for storing a sticky status bit, wherein the sticky status bit is set to a logic high state when the system reset signal is generated during the predetermined time period,
   the processor fetches the CPRI configuration data and the SerDes configuration data when the processor is functional after reset and restores data traffic when the sticky status bit is at the logic high state, thereby preventing disruption in the network topology, and
   the processor sets the sticky status bit to a logic low state after fetching the CPRI configuration data and the SerDes configuration data.

10. The integrated circuit of claim 7, wherein the L1 reset controller generates the system reset signal and the CPRI sub-system reset signal when the traffic idle signal is at least one of received after the predetermined time period and not received during the predetermined time period.

11. The integrated circuit of claim 10, wherein the L1 reset controller resets the processor sub-system and the CPRI sub-system by way of the system reset signal and the CPRI sub-system reset signal, respectively, after the predetermined time period, thereby recovering the radio equipment node.

12. The integrated circuit of claim 11, wherein the L1 reset controller functions normally after resetting and de-asserts the CPRI sub-system reset signal, and wherein de-asserting the CPRI sub-system reset signal indicates that the CPRI sub-system is functional.

13. A method for recovering a radio equipment node of a plurality of radio equipment nodes in a communication system, wherein the communication system includes a radio equipment controller connected to the plurality of radio equipment nodes by way of a common public radio interface (CPRI) link in a predetermined network topology, the method comprising:

receiving a CPRI reset request at a CPRI controller by way of a CPRI slave port;

generating a reset request signal based on the CPRI reset request;

receiving the reset request signal at a layer 1 (L1) reset controller;

generating a traffic stop signal and a timer start signal based on the reset request signal;

receiving the traffic stop signal at the CPRI controller;

receiving the timer start signal at a counter;

generating a timer end signal after a predetermined time period based on the timer start signal;

generating a traffic idle signal based on the traffic stop signal;

receiving at least one of the traffic idle signal and the timer end signal; and generating a system reset signal when the traffic idle signal is received during the predetermined time period, wherein the L1 reset controller resets a processor of the radio equipment node by way of the system reset signal, thereby recovering the radio equipment node.

14. The method of claim 13, wherein the CPRI reset request is generated by the radio equipment controller and is indicative of a L1 in-band reset signal.

15. The method of claim 14, further comprising providing the system reset signal to a processor sub-system, wherein the processor sub-system includes the processor, a plurality of electronic circuits, and a system bus.

16. The method of claim 15, further comprising storing CPRI configuration data and SerDes configuration data in a plurality of registers.

17. The method of claim 16, further comprising resetting the system reset controller when the system reset signal is generated by the L1 reset controller, wherein resetting the system reset controller resets the L1 reset controller and the counter.

18. The method of claim 17, further comprising:

storing a sticky status bit in a system reset control register;

setting the sticky status bit at a logic high state when the system reset signal is generated during the predetermined time period;

fetching the CPRI configuration data and the SerDes configuration data when the processor is functional after reset and restoring data traffic by the processor when the sticky status bit is at the logic high state, thereby preventing disruption in the network topology; and setting the sticky status bit to a logic low state after fetching the CPRI configuration data and the SerDes configuration data.

19. The method of claim 17, further comprising:

generating the system reset signal and a CPRI sub-system reset signal when the timer end signal is received after the predetermined time period and the traffic idle signal is not received in the predetermined time period by the L1 reset controller; and resetting the processor sub-system and the CPRI sub-system by providing the system reset signal and the CPRI sub-system reset signal to the processor and the CPRI sub-system, respectively, thereby recovering the radio equipment node.

20. The method of claim 19, further comprising de-asserting the CPRI sub-system reset signal after the L1 reset controller is reset, thereby indicating that the CPRI sub-system is functional.

* * * * *